(12) United States Patent
Yamada et al.

(10) Patent No.: US 11,156,569 B2
(45) Date of Patent: Oct. 26, 2021

(54) X-RAY FLUORESCENCE SPECTROMETER

(71) Applicant: RIGAKU CORPORATION, Tokyo (JP)

(72) Inventors: Yasujiro Yamada, Takatsuki (JP); Shinya Hara, Takatsuki (JP); Takashi Matsuo, Takatsuki (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 17/264,985

(22) PCT Filed: Jun. 6, 2019

(86) PCT No.: PCT/JP2019/022632
§ 371 (c)(1),
(2) Date: Feb. 1, 2021

(87) PCT Pub. No.: WO2020/031487
PCT Pub. Date: Feb. 13, 2020

(65) Prior Publication Data
US 2021/0262954 A1 Aug. 26, 2021

(30) Foreign Application Priority Data
Aug. 9, 2018 (JP) .............................. JP2018-149950

(51) Int. Cl.
*G01N 23/223* (2006.01)
*G01N 23/207* (2018.01)
*G01N 23/20008* (2018.01)

(52) U.S. Cl.
CPC ..... *G01N 23/223* (2013.01); *G01N 23/20008* (2013.01); *G01N 23/2076* (2013.01);
(Continued)

(58) Field of Classification Search
None
See application file for complete search history.

(56) References Cited

U.S. PATENT DOCUMENTS 5,200,625 A * 4/1993 Kawai ...................... G01T 1/36
250/374
6,310,935 B1 10/2001 Kuwabara
(Continued)

FOREIGN PATENT DOCUMENTS

CN 101133300 A * 2/2008 ............. G01B 15/02
CN 101248349 A 8/2008
(Continued)

OTHER PUBLICATIONS

Communication dated Apr. 30, 2021 by The State Intellectual Property Office of People's Republic of China in application No. 201980052429.6.
(Continued)

Primary Examiner — Thomas R Artman
(74) Attorney, Agent, or Firm — Sughrue Mion, PLLC

(57) ABSTRACT

A X-ray fluorescence spectrometer of the present invention simultaneously generates an analytical pulse-height width profile and a narrow pulse-height width profile that are distributions of intensities of secondary X-rays (7) against scan angles (2θ) set by an interlocking unit (10) on the basis of a differential curve which is output by a multichannel pulse-height analyzer (13), as well as a predetermined analytical pulse-height width for an analytical line that is a primary reflection line and a predetermined narrow pulse-height width that is narrower than the analytical pulse-height width. Identification of the analytical lines is performed for the analytical pulse-height width profile and the narrow pulse-height width profile, and any analytical line identified only in the narrow pulse-height width profile is added to the analytical lines identified in the analytical pulse-height width profile to obtain an identification result of the analytical lines.

2 Claims, 8 Drawing Sheets

(52) U.S. Cl.
CPC ............... *G01N 2223/076* (2013.01); *G01N 2223/1016* (2013.01); *G01N 2223/304* (2013.01); *G01N 2223/507* (2013.01)

(56) References Cited

U.S. PATENT DOCUMENTS

| | | |
|---|---|---|
| 7,646,846 B2 | 1/2010 | Tanimoto et al. |
| 8,774,356 B2 | 7/2014 | Kataoka et al. |
| 9,778,214 B2 | 10/2017 | Sako |
| 10,082,475 B2* | 9/2018 | Hara ............... G01N 23/223 |
| 10,161,889 B2 | 12/2018 | Hara et al. |
| 2009/0122957 A1 | 5/2009 | Tanimoto et al. |
| 2013/0294577 A1 | 11/2013 | Kataoka et al. |
| 2017/0184519 A1 | 6/2017 | Sako |
| 2018/0106736 A1* | 4/2018 | Hara ............... G01N 23/2076 |
| 2018/0180563 A1 | 6/2018 | Hara et al. |

FOREIGN PATENT DOCUMENTS

| | | |
|---|---|---|
| CN | 103415766 A | 11/2013 |
| CN | 106716115 A | 5/2017 |
| CN | 107923859 A | 4/2018 |
| EP | 1927848 A1 | 6/2008 |
| JP | 7-55734 A | 3/1995 |
| JP | 2592723 B2 | 12/1996 |
| JP | 2001-41909 A | 2/2001 |
| JP | 2001249089 A | 9/2001 |
| JP | 2002365245 A | 12/2002 |
| JP | 2005-351687 A | 12/2005 |
| RU | 2611726 C1 | 2/2017 |
| WO | 2007/034570 A1 | 3/2007 |

OTHER PUBLICATIONS

Decision to Grant a Patent on Corresponding JP Patent Appln. No. 2018-149950 dated Nov. 4, 2020.
International search report for PCT/JP2019/022632 dated Jul. 30, 2019.
Written Opinion of the International Searching Authority (PCT/ISA/237) dated Jul. 30, 2019 and International Preliminary Report on Patentability (PCT/IB/373) dated Feb. 18, 2021 issued by the International Bureau in International Application No. PCT/JP2019/022632.

* cited by examiner

X-RAY FLUORESCENCE SPECTROMETER

CROSS REFERENCE TO THE RELATED APPLICATION

This application is based on and claims Convention priority to Japanese patent application No. 2018-149950, filed Aug. 9, 2018, the entire disclosure of which is herein incorporated by reference as a part of this application.

BACKGROUND OF THE INVENTION

Field of the Invention

The present invention relates to a sequential X-ray fluorescence spectrometer.

Description of Related Art

Sequential X-ray fluorescence spectrometers interlock a spectroscopic device and a detector to generate a 2θ profile that is a distribution of intensities of secondary X-rays against scan angles of 2θ, and perform peak search and identification of analytical lines in order to perform qualitative analysis. Many of such spectroscopic devices may simultaneously produce a primary reflection line obtained by primary diffraction of X-rays having a certain wavelength as well as a higher order reflection line (n-th order reflection line) obtained by higher-order diffraction (n-th order diffraction) of X-rays having an 1/n (n is a natural number of 2 or greater) wavelength of the certain wavelength. Therefore, a 2θ profile may show an analytical line that is a primary reflection line of fluorescent X-rays of a certain element and a higher order reflection line of fluorescent X-rays of another element, which appears at a scan angle close to that of the analytical line and thus acts as an interfering line, making it difficult to identify the analytical line.

In such a case, it is possible to identify the analytical line by appropriately narrowing a window of a pulse height analyzer for selecting pulses within a predetermined pulse height range (a so-called window width) from all the pulses generated in a detector and generating a 2θ profile again. This, however, requires performing another scan while interlocking the spectroscopic device and the detector, and it is not always easy to appropriately narrow the window such that the analytical line can be identified.

For these reasons, there is a sequential X-ray fluorescence spectrometer that employs a multichannel pulse height analyzer to separately and simultaneously generate 2θ profiles of primary reflection lines and higher order reflection lines in a single scan and performs identification of the analytical lines (see Patent Document 1).

RELATED DOCUMENT

Patent Document

[Patent Document 1] JP Laid-open Patent Publication No. 2001-41909

SUMMARY OF THE INVENTION

In order to identify analytical lines using this spectrometer, however, it is necessary to perform analytical processing for estimating overlap of a higher order reflection line with a primary reflection line on the basis of N profiles of primary reflection lines and higher order reflection lines, and, further, in order to perform the analytical processing, it is necessary to measure standard samples in advance to calculate a ratio of a peak intensity of the primary reflection line and a peak intensity of the higher order reflection line. In addition, even if such analytical processing based on measurement of standard samples is applied to individual analytical samples, it is not always possible to accurately estimate overlap of a higher order reflection line with a primary reflection line.

In view of such conventional problems, an object of the present invention is to provide a sequential X-ray fluorescence spectrometer capable of quickly and accurately identifying analytical lines.

In order to achieve the above object, the present invention provides an X-ray fluorescence spectrometer basically including: an X-ray source configured to irradiate a sample with primary X-rays; a spectroscopic device configured to monochromate secondary X-rays generated from the sample; a detector configured to receive the secondary X-rays monochromated by the spectroscopic device and generate a number of pulses proportional to intensities of the secondary X-rays, the pulses having pulse heights proportional to energy of the secondary X-rays; and an interlocking unit configured to interlock the spectroscopic device and the detector so as to change wavelengths of the secondary X-rays entering the detector. That is, it is a sequential X-ray fluorescence spectrometer.

The X-ray fluorescence spectrometer of the present invention further includes: a multichannel pulse height analyzer configured to separate the pulses generated in the detector in accordance with a plurality of pulse height ranges and count the pulses in the respective pulse height ranges to output a differential curve that is a distribution of the intensities of the secondary X-rays against the pulse heights; and a qualitative analysis unit configured to simultaneously generate, for the secondary X-rays entering the detector at the wavelengths changed by the interlocking unit, an analytical pulse height width profile and a narrow pulse height width profile that are distributions of the intensities of the secondary X-rays against scan angles set by the interlocking unit on the basis of the differential curve which is output by the multichannel pulse height analyzer, as well as a predetermined analytical pulse height width for an analytical line that is a primary reflection line and a predetermined narrow pulse height width that is narrower than the analytical pulse height width.

Then, the qualitative analysis unit identifies the analytical lines in the analytical pulse height width profile and the narrow pulse height width profile and adds any analytical line identified only in the narrow pulse height width profile to the analytical lines identified in the analytical pulse height width profile to obtain an identification result of the analytical lines.

According to the X-ray fluorescence spectrometer of the present invention, a single scan using the multichannel pulse height analyzer generates, as 2θ profiles, an analytical pulse height width profile with a predetermined analytical pulse height width appropriate for cases where there is no higher order reflection line appearing at a close scan angle to that of an analytical line, as well as a narrow pulse height width profile with a predetermined narrow pulse height width appropriate for cases where there is a higher order reflection line appearing at a close scan angle to that of an analytical line. Also, since the analytical line(s) identified only in the narrow pulse height width profile is(are) automatically added to the analytical lines identified in the analytical pulse height width profile, it is possible to quickly and accurately identify the analytical lines.

In the X-ray fluorescence spectrometer of the present invention, it is preferred that the X-ray fluorescence spectrometer includes a plurality of types of the spectroscopic devices and an exchange mechanism configured to switch the spectroscopic devices to be used; the qualitative analysis unit identifies higher order reflection lines in the analytical pulse height width profile and the narrow pulse height width profile; the X-ray fluorescence spectrometer includes a semi-quantitative analysis unit configured to perform semi-quantitative analysis that is quantitative analysis based on the analytical pulse height width profile and the narrow pulse height width profile; and the semi-quantitative analysis unit operates in the following manner.

First, when selecting an analytical line for each analytical element, it is determined whether a higher order reflection line that acts as an interfering line interfering with the analytical line identified in the analytical pulse height width profile is identified. If the higher order reflection line is not identified, the analytical line is selected. If the higher order reflection line is identified, it is determined whether the analytical pulse height width profile includes the same analytical line monochromated by the spectroscopic device for removing the higher order reflection line. Then, if the same analytical line is included, that analytical line is selected. If the same analytical line is not included, it is determined whether the analytical pulse height width profile includes an analytical line of a different kind.

Then, if the analytical line of the different kind is included, the analytical line under consideration in the narrow pulse height width profile is selected. If the analytical line of the different kind is included, it is determined whether a higher order reflection line that acts as an interfering line interfering with the analytical line of the different kind is identified. Then, if the higher order reflection line is not identified, the analytical line of the different kind is selected. If the higher order reflection line is identified, the analytical line in the narrow pulse height width profile, which has a larger theoretical scan angle difference with respect to the higher order reflection line, is selected from the analytical line under consideration and the analytical line of the different kind. Then, semi-quantitative analysis is performed based on the intensities of the analytical lines selected in this procedure.

In the case of this preferred configuration, the analytical pulse height width profile includes the analytical lines monochromated by the spectroscopic devices for removing the higher order reflection lines, and for each analytical element, an analytical line not or least overlapping with a higher order reflection line is automatically selected from the analytical lines processed by different spectroscopic devices or the analytical lines of mutually different kinds appearing in the analytical pulse height width profile and the narrow pulse height width profile. Therefore, it is possible to perform sufficiently accurate semi-quantitative analysis without requiring correction of overlaps of the higher order reflection lines based on the intensities of the selected analytical lines.

Any combination of at least two constructions disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever. The scope of the present invention is defined by the appended claims. In the accompanying drawings, like reference numerals are used to denote like parts throughout the several views. In the figures, FIG. 1 schematically illustrates an X-ray fluorescence spectrometer according to an embodiment of the present invention;

DESCRIPTION OF EMBODIMENTS

Figure 1:
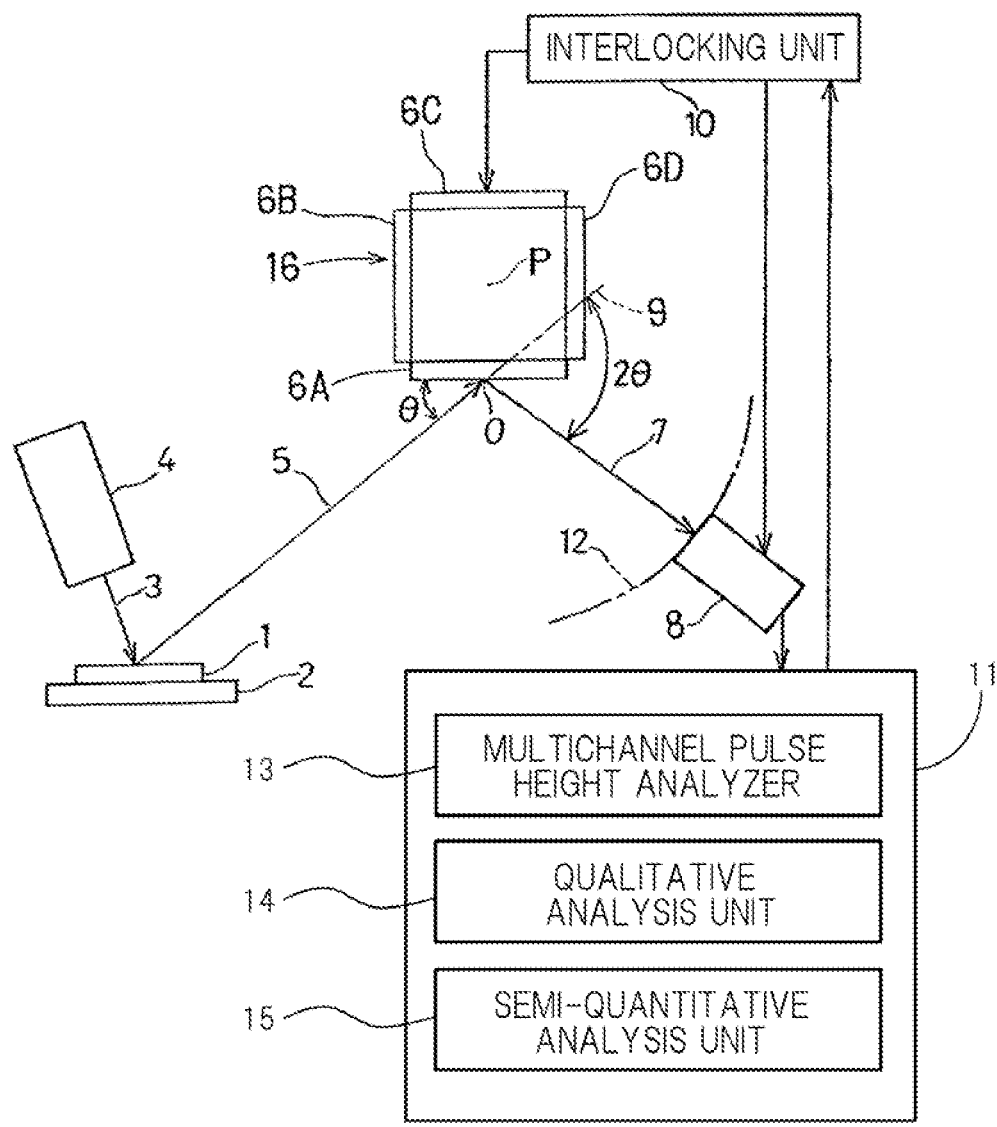

Hereinafter, an X-ray fluorescence spectrometer according to an embodiment of the present invention will be described with reference to the drawings. As shown in FIG. 1, this X-ray fluorescence spectrometer is a sequential X-ray fluorescence spectrometer including: an X-ray source 4, such as an X-ray tube, configured to irradiate a sample 1 placed on a sample stage 2 with primary X-rays 3; a spectroscopic device 6 (reference numeral "6" collectively represents reference numerals "6A," "6B," "6C" and "6D," which will be mentioned later) configured to monochromate secondary X-rays 5, such as fluorescent X-rays generated from the sample 1; a detector 8 configured to receive the secondary X-rays 7 monochromated by the spectroscopic device 6 and measure intensities of the secondary X-rays 7; and an interlocking unit 10, such as a goniometer, configured to interlock the spectroscopic device 6 and the detector 8 such that the spectroscopic device 6 monochromates the secondary X-rays 7 at varying wavelengths while the detector 8 receives the monochromated secondary X-rays 7.

That is, when the secondary X-rays 5 enter the spectroscopic device 6 at a certain incident angle $\theta$, an extension line 9 of the secondary X-rays 5 and the secondary X-rays 7 monochromated (diffracted) by the spectroscopic device 6 form a spectroscopic angle $2\theta$ twice as wide as the incident angle $\theta$. The interlocking unit 10 rotates the spectroscopic device 6, which has been switched by an exchange mechanism 16 (described below) and is in use, by a rotation angle about an axis O, which is perpendicular to the drawing sheet of FIG. 1 and passes through the center of a surface of the spectroscopic device 6, and rotates the detector 8 by an angle twice as wide as the rotation angle about the axis O along a circle 12 such that the spectroscopic angle 2θ is changed so as to change wavelengths of the secondary X-rays 7 to be monochromated while the monochromated secondary X-rays 7 continuously enter the detector 8.

The X-ray fluorescence spectrometer also includes a plurality of types, e.g., four types, of spectroscopic devices 6A, 6B, 6C, 6D, and the spectroscopic devices 6 to be used are switched as the exchange mechanism 16 to which the four types of the spectroscopic device 6A, 6B, 6C, 6D are attached rotates about the center axis P perpendicular to the plane. The four types of the spectroscopic devices 6A, 6B, 6C, and 6D are PETH, Ge, LiF (200), and RX25, respectively. It should be noted that, depending on the types of the spectroscopic devices 6, the secondary X-rays 7 that are monochromated and simultaneously enter the detector 8 as described above may include not only an analytical line that is a primary reflection line of fluorescent X-rays of a certain element, but also higher order reflection lines of fluorescent X-rays of other elements.

The X-ray fluorescence spectrometer further includes a controller 11 that is a computer, the controller including a multichannel pulse height analyzer 13, a qualitative analysis unit 14 and a semi-quantitative analysis unit 15, which will be described below. The multichannel pulse height analyzer 13 separates pulses generated in the detector 8 in accordance with a plurality of pulse height ranges and count the pulses in the respective pulse height ranges to output a differential curve that is a distribution of the intensities of the secondary X-rays 7 against the pulse heights.

The qualitative analysis unit 14 simultaneously generates, for the secondary X-rays 7 entering the detector 8 at the wavelengths of the secondary X-rays 7 changed by the interlocking unit 10, an analytical pulse height width profile and a narrow pulse height width profile that are distributions of the intensities of the secondary X-rays 7 against the scan angles of 2θ (which may also be referred to as "2θ angle" in the same manner as the spectroscopic angle) set by the interlocking unit 10 on the basis of the differential curve which is output by the multichannel pulse height analyzer 13, as well as a predetermined analytical pulse height width for an analytical line that is a primary reflection line and a predetermined narrow pulse height width that is narrower than the analytical pulse height width.

Then, the qualitative analysis unit 14 identifies analytical lines in the analytical pulse height width profile and the narrow pulse height width profile and adds any analytical line(s) identified only in the narrow pulse height width profile to the analytical lines identified in the analytical pulse height width profile to obtain an identification result of the analytical lines. Further, the qualitative analysis unit also identifies higher order reflection lines in the analytical pulse height width profile and the narrow pulse height width profile.

Figure 2:
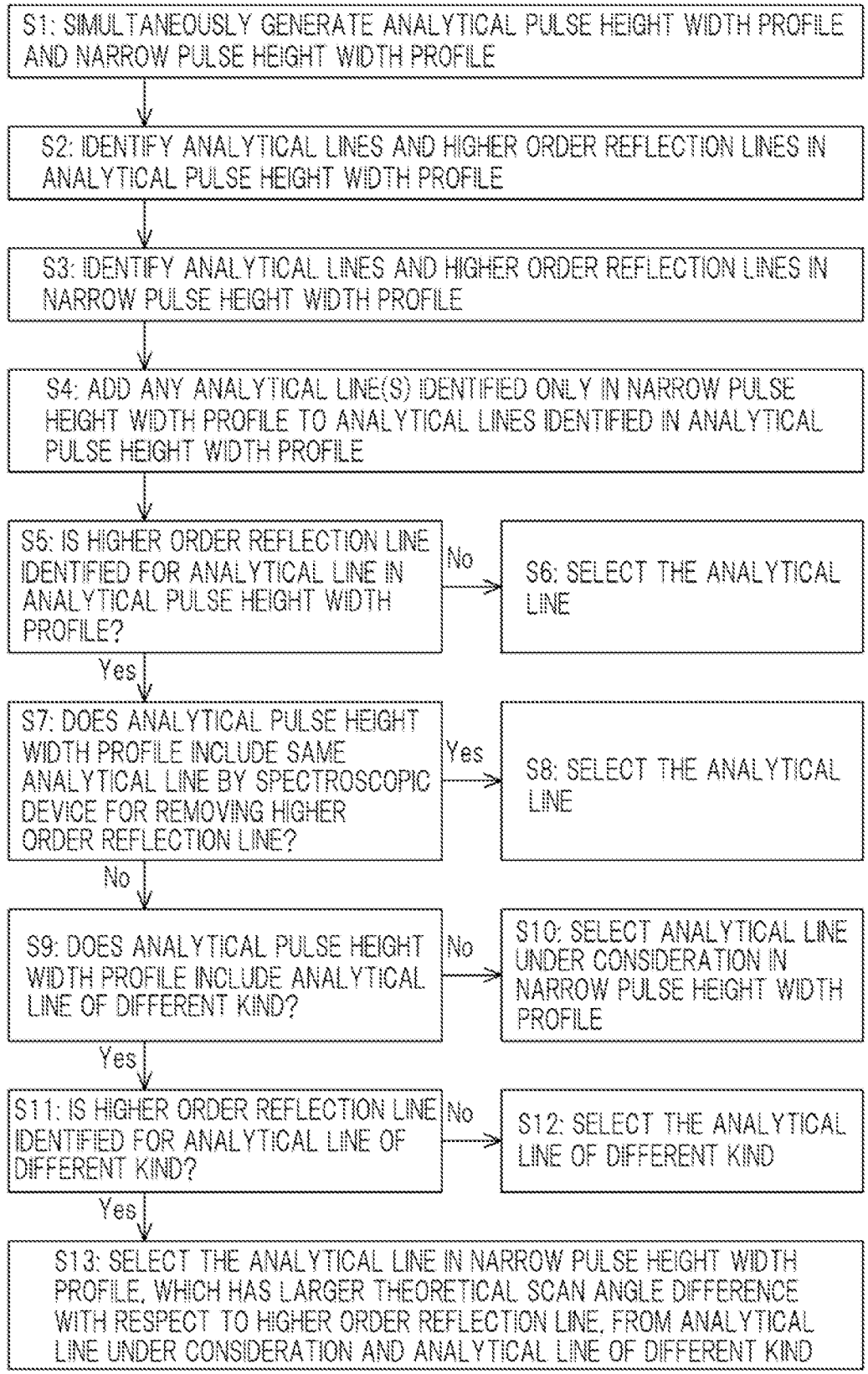
FIG. 2 is a flowchart representing an operation of the X-ray fluorescence spectrometer.

The semi-quantitative analysis unit 15 performs semi-quantitative analysis that is quantitative analysis based on the analytical pulse height width profile and the narrow pulse height width profile. Operation of the qualitative analysis unit 14 and the semi-quantitative analysis unit 15 will be described below in accordance with the flowchart shown in FIG. 2.

First, in step S1, a single scan of a sample 1 to be analyzed is carried out by the interlocking unit 10, and an analytical pulse height width profile and a narrow pulse height width profile are simultaneously generated as two types of 2θ profiles, for the secondary X-rays 7 entering the detector 8 at varying wavelengths, on the basis of a differential curve that is output by the multichannel pulse height analyzer 13 in real time, as well as a predetermined analytical pulse height width for the an analytical line that is a primary reflection line and a predetermined narrow pulse height width that is narrower than the analytical pulse height width.

Figure 3:
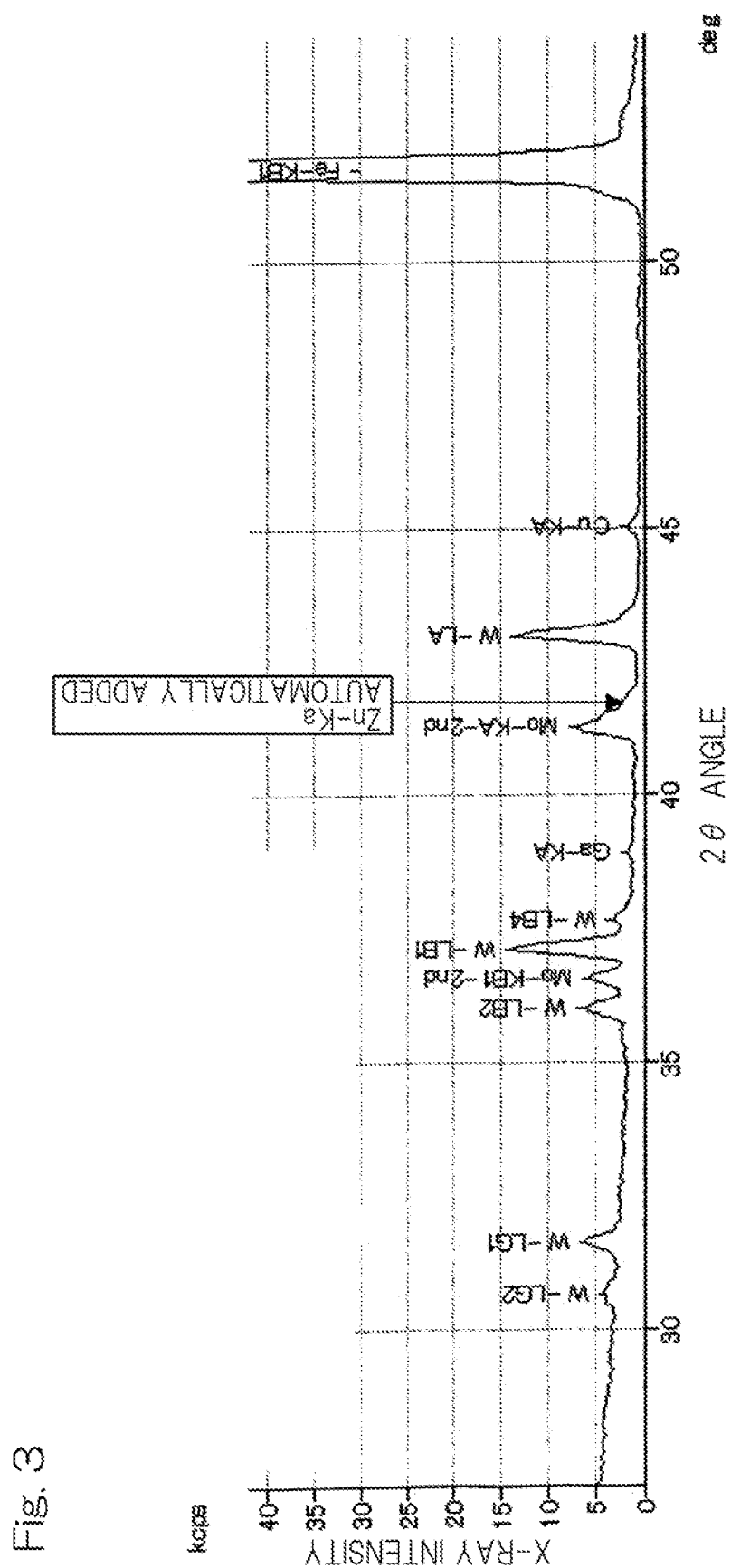
FIG. 3 shows an example of an analytical pulse height width profile generated by the X-ray fluorescence spectrometer.
Figure 4:
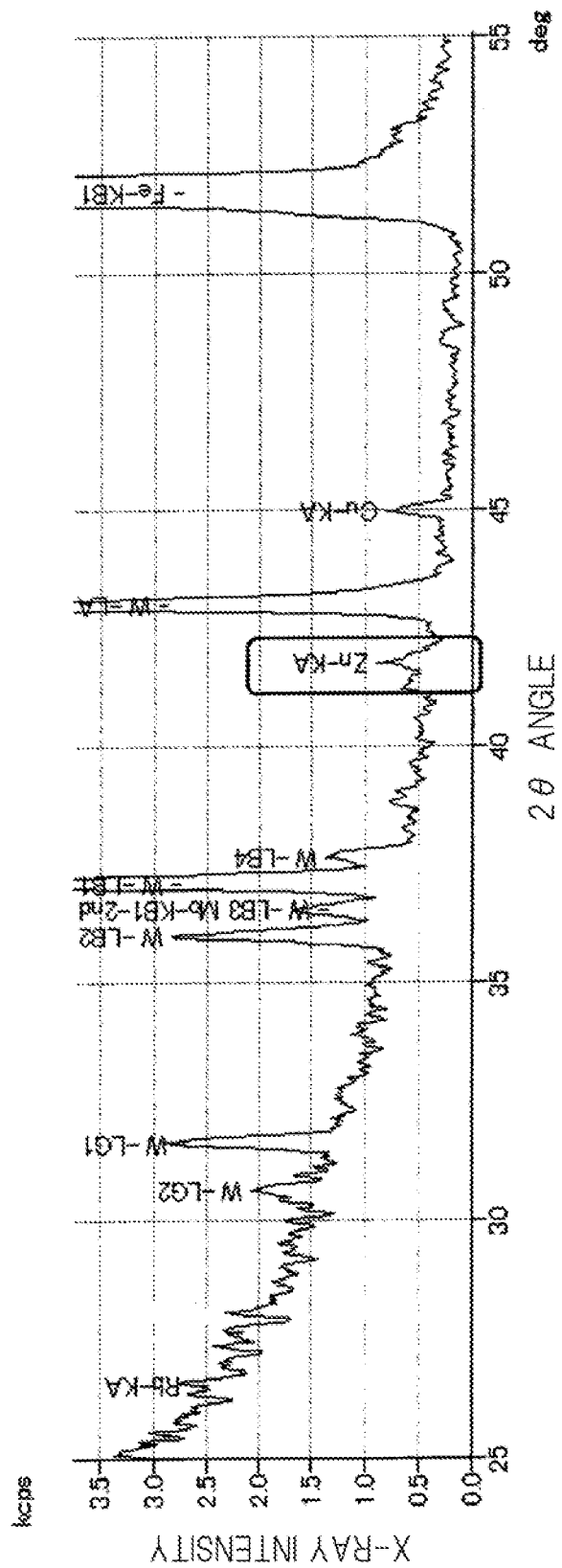
FIG. 4 shows an example of a narrow pulse height width profile generated by the X-ray fluorescence spectrometer.

The predetermined analytical pulse height width corresponds to a pulse height width appropriate for cases where there is no higher order reflection line appearing at a close scan angle 2θ to that of an analytical line and may be, e.g., a width of 200V ranging from 100V to 300V, whereas the predetermined narrow pulse height width corresponds to a pulse height width appropriate for cases where there is a higher order reflection line appearing at a close scan angle 2θ to that of an analytical line and may be, e.g., a width of 40V ranging from 180V to 220V. FIG. 3 and FIG. 4 show an analytical pulse height width profile and a narrow pulse height width profile, respectively, generated in an example in which a molybdenum ore is used as a sample.

Next, in step S2, the analytical lines and the higher order reflection lines in the analytical pulse height width profile are identified by known peak search. In FIG. 3 to FIG. 8, the letter "G" in the "LG" denotes "γ"; the "B" in the "LB" denotes "β"; the "A" and "a" in the "KA" and "Kα" denote "a"; the term "2nd" denotes "secondary"; and the "4th" denotes "fourth-order." In the analytical pulse height width profile shown in FIG. 3, since Mo-Kα-2nd line that is a higher order reflection line appears at a close scan angle 2θ to that of Zn-Kα line, which is intended to be an analytical line, the Zn-Kα line does not show any peak and thus is not identified.

Then, in step S3, the analytical lines and the higher order reflection lines in the narrow pulse height width profile are identified by known peak search in the same manner. In the narrow pulse height width profile shown in FIG. 4, the Zn-Kα line, which is not identified in the analytical pulse height width profile, is identified as an analytical line because influence of the higher order reflection lines on the primary reflection lines is relatively smaller in this profile, through the intensities of the X-rays are lower, compared with those in the analytical pulse height width profile shown in FIG. 3.

Next, in step S4, the Zn-Kα line that is the analytical line identified only in the narrow pulse height width profile shown in FIG. 4 is automatically added to the analytical lines identified in the analytical pulse height width profile in FIG. 3, such as Cu-Kα line, W-Lα line, Ga-Kα line, as illustrated in FIG. 3, so as to obtain an identification result of the analytical lines. It should be noted that when identifying the analytical lines, it is sufficient to determine, for each of the peaks searched in the analytical pulse height width profile and the narrow pulse height width profile, an analytical line of what kind the peak represents or whether it is a peak other than those of the analytical lines, and it is not necessary to determine the kinds of higher order reflection lines, i.e., to identify the higher order reflection lines.

Thus, according to the X-ray fluorescence spectrometer of the present invention, a single scan using the multichannel pulse height analyzer 13 generates, as 2θ profiles, an analytical pulse height width profile (for example, FIG. 3) with a predetermined analytical pulse height appropriate for cases where there is no higher order reflection line appearing at a close scan angle of 2θ to that of an analytical line, as well as a narrow pulse height width profile (for example, FIG. 4) with a predetermined narrow pulse height width appropriate for cases where there is a higher order reflection line appearing at a close scan angle of 2θ to that of an analytical line. Also, since the analytical line(s) (for example, the Zn-Kα line in FIG. 4) identified only in the narrow pulse height width profile is(are) automatically added to the analytical lines identified in the analytical pulse height width profile, it is possible to quickly and accurately identify the analytical lines in qualitative analysis.

Next, when selecting an analytical line for each analytical element from the analytical lines identified in the qualitative analysis to perform semi-quantitative analysis, in step S5, it is determined whether any higher order reflection line that acts as an interfering line interfering with any of the analytical lines in the analytical pulse height width profile (including those added in step S4) is identified. The phrase that a "higher order reflection line that acts as an interfering line interfering with any of the analytical lines is identified" means that a higher order reflection line is identified at such a close scan angle that the higher order reflection line would be determined as affecting the intensity of an analytical line by a known technique, and this is simply worded in FIG. 2 as a higher order reflection line is identified for an analytical line.

Figure 5:
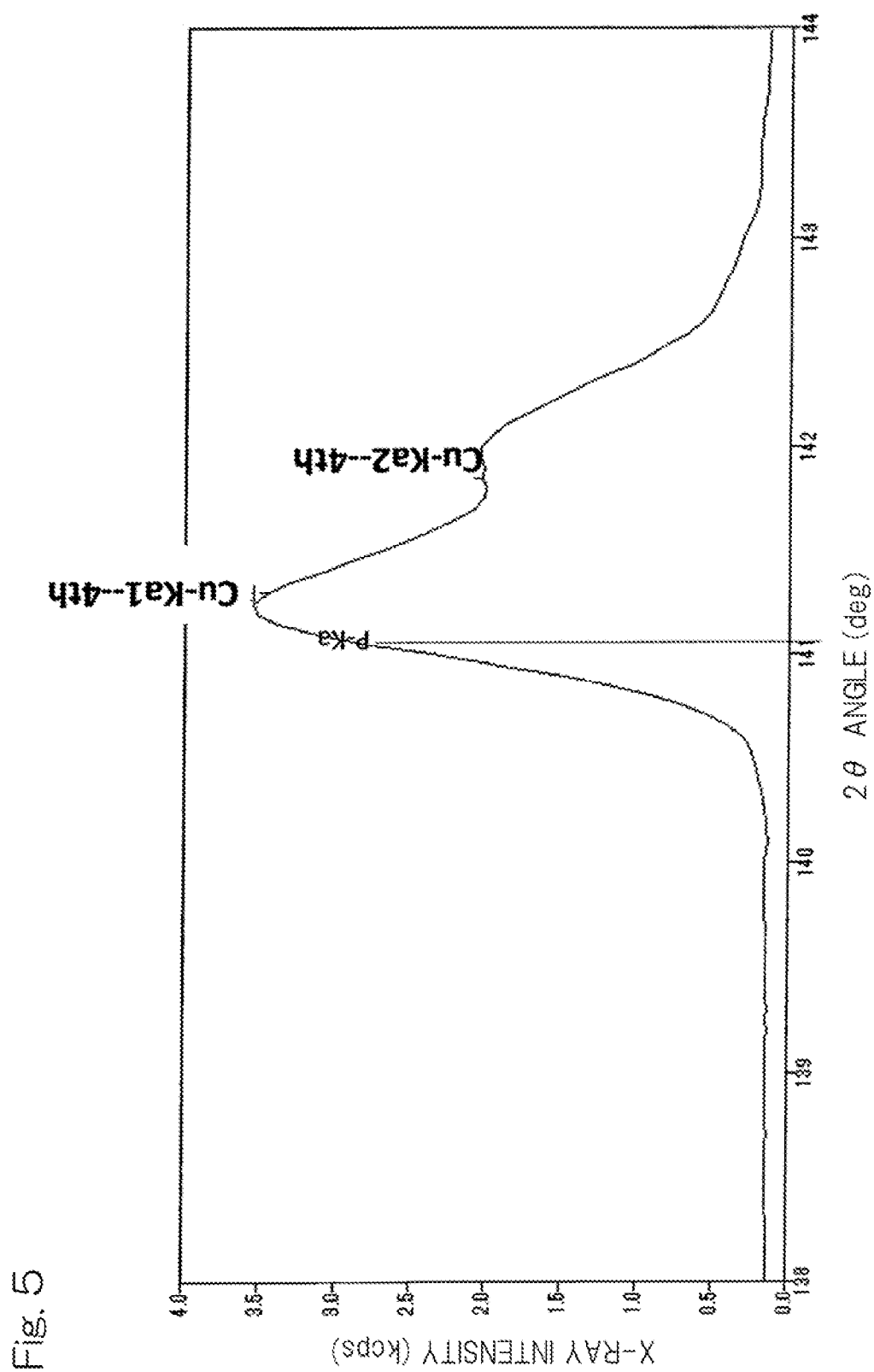
FIG. 5 shows an example in which a higher order reflection line that acts as an interfering line interfering with an analytical line identified in an analytical pulse height width profile is identified.

If such a higher order reflection line is not identified, the analytical line is selected in step S6. In contrast, as in FIG. 5 showing a section of an analytical pulse height width profile for a case where a copper alloy is used as a sample, and the spectroscopic device 6B (namely, Ge) is used for this section, if Cu-Kα1-4th line is identified as a higher order reflection line that acts as an interfering line interfering with P-Kα line identified as an analytical line, in step S7, it is determined whether the analytical pulse height width profile includes the P-Kα line that is the same analytical line monochromated by the spectroscopic device for removing the higher order reflection line, i.e., the Cu-Kα1-4th line.

Figure 6:
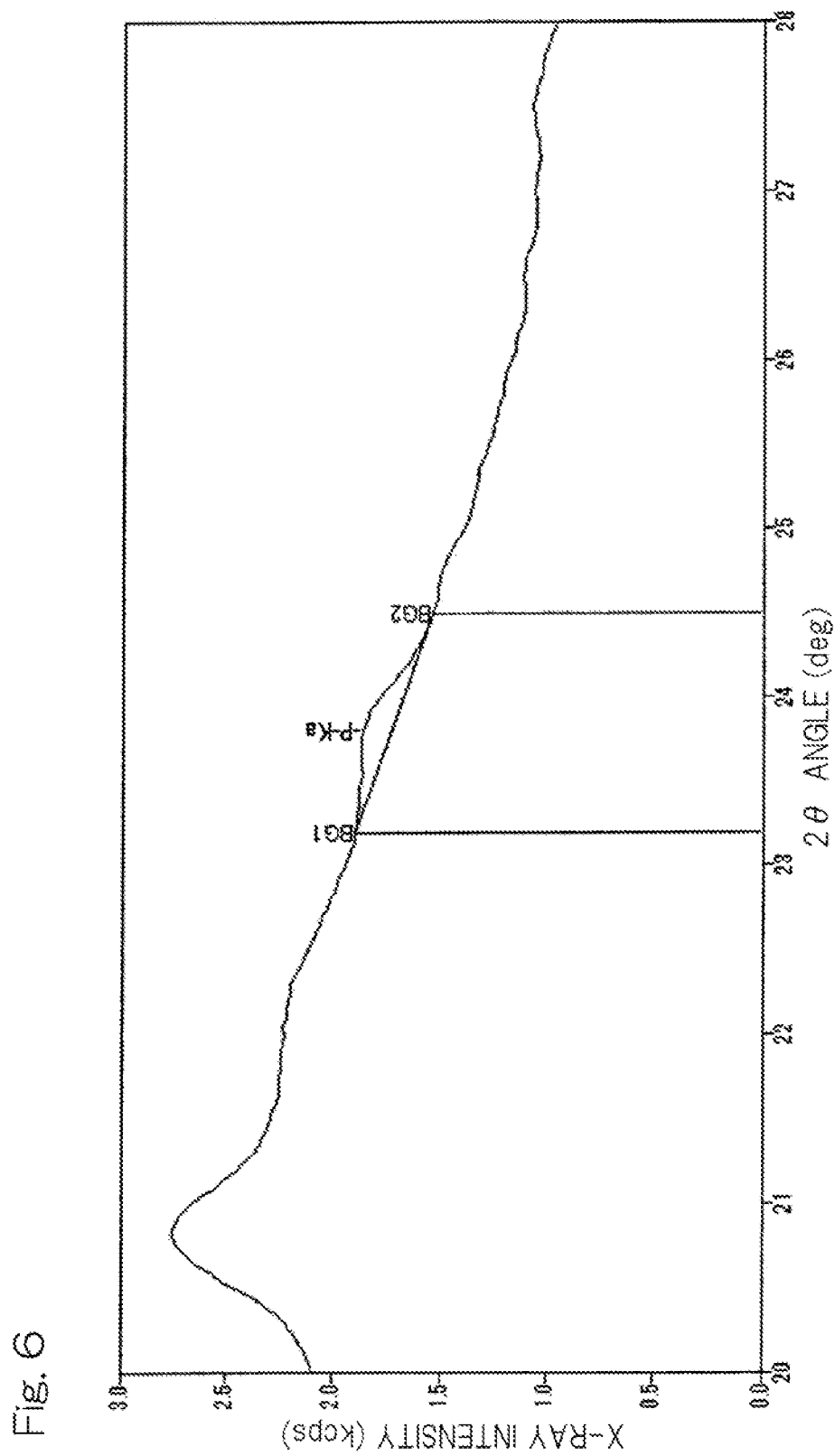
FIG. 6 shows an example in which an analytical pulse height width profile includes the same analytical line as that in FIG. 5, which has been monochromated by a spectroscopic device for removing the higher order reflection line identified in FIG. 5.

As shown in the analytical pulse height width profile in FIG. 6, if the P-Kα line monochromated by the spectroscopic device 6D (namely, RX25) for removing the Cu-Kα1-4th line is included, in step S8, the P-Kα line in the analytical pulse height width profile shown in FIG. 6 is selected as an analytical line. In this regard, the intensity of the P-Kα line is, for example, an intensity calculated by subtracting an average intensity of BG1 and BG2 as a background intensity from the peak intensity of the P-Kα line in FIG. 6, using a known technique. In contrast, if the same analytical line monochromated by the spectroscopic device for removing the higher order reflection line is not included in the analytical pulse height width profile, in step S9, it is determined whether the analytical pulse height width profile includes any analytical line of a different kind.

If the analytical pulse height width profile does not include any analytical line of a different kind, in step S10, the analytical line under consideration in the narrow pulse height width profile is selected. In contrast, if the analytical pulse height width profile includes an analytical line of a different kind, in step S11, it is determined whether any higher order reflection line that acts as an interfering line interfering with the analytical line of the different kind is identified.

If no higher order reflection line that acts as an interfering line interfering with the analytical line of the different kind is identified in the analytical pulse height width profile, in step S12, the analytical line of the different kind is selected.

Figure 7:
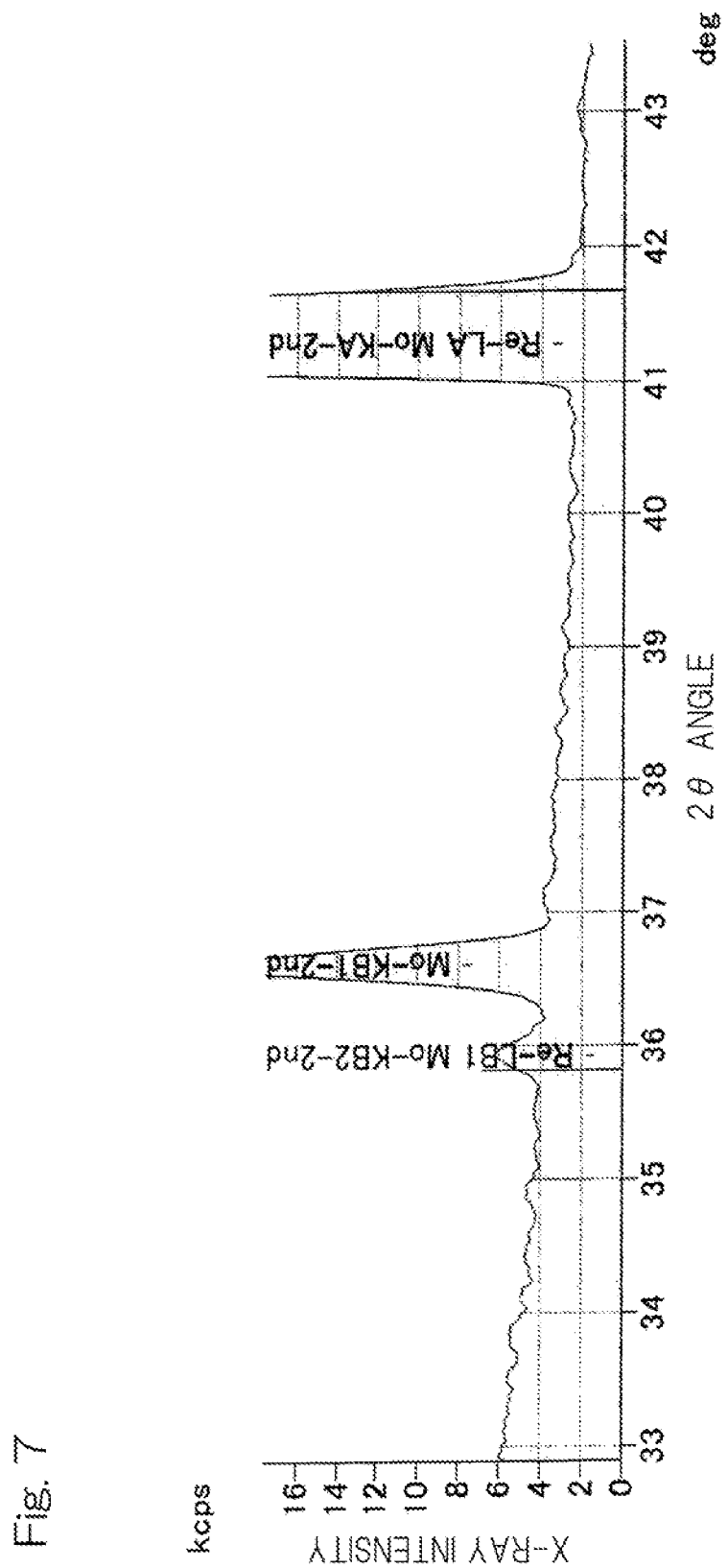
FIG. 7 shows an example in which an analytical pulse height width profile includes analytical lines of different kinds, and higher order reflection lines that act as interfering lines interfering with the analytical lines of different kinds are identified.
Figure 8:
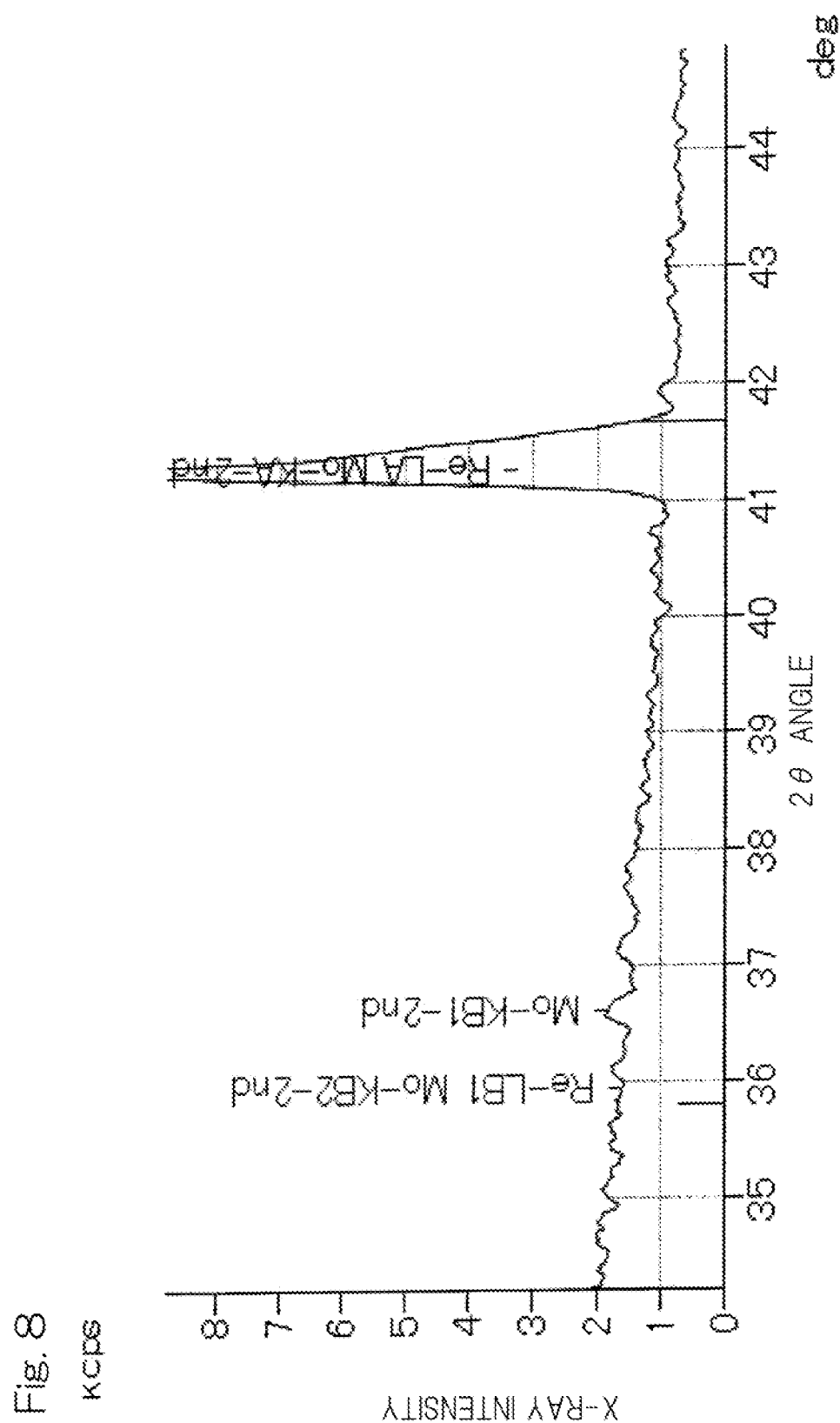
FIG. 8 is a narrow pulse height width profile corresponding to FIG. 7.

In contrast, in the case where a higher order reflection line that acts as an interfering line interfering with the analytical line of the different kind is identified in the analytical pulse height width profile, as in FIG. 7 showing an analytical pulse height width profile for a case where, for example, a sample contains molybdenum as a main component, if Mo-Kα-2nd line is identified as a higher order reflection line that acts as an interfering line interfering with Re-Lα line (i.e., an analytical line), and Mo-Kβ-2nd line is identified as a higher order reflection line that acts as an interfering line interfering with Re-Lβ1 line (i.e., an analytical line of a different kind), in step S13, the analytical line in the narrow pulse height width profile shown in corresponding FIG. 8, which has a larger theoretical scan angle difference with respect to the higher order reflection line, is selected from the Re-Lα line that is an analytical line under consideration and the Re-Lβ1 line that is an analytical line of a different kind. In this case, since there is a larger difference in the theoretical scan angles between the Re-Lβ1 line and the Mo-Kβ-2nd line than between the Re-Lα line and the Mo-Kα-2nd line, the Re-Lβ1 line in the narrow pulse height width profile in FIG. 8 is selected as an analytical line.

Then, semi-quantitative analysis is performed based on the intensities of the analytical lines selected in this procedure. Thus, according to the X-ray fluorescence spectrometer of the present embodiment, the analytical pulse height width profile includes the analytical line monochromated by the spectroscopic device 6D for removing the higher order reflection line, and for each analytical element, an analytical line not or least overlapping with a higher order reflection line is automatically selected from the analytical lines processed by different spectroscopic devices or the analytical lines of mutually different kinds appearing in the analytical pulse height width profile and the narrow pulse height width profile. Therefore, it is possible to perform sufficiently accurate semi-quantitative analysis without requiring correction of overlaps of the higher order reflection lines based on the intensities of the selected analytical lines.

Although the preferred embodiments of the present invention have been described with reference to the drawings, those skilled in the art who read this description would readily recognize possible various changes and modifications without departing from the scope of the invention. Accordingly, such changes and modifications should also be included within the scope of the present invention, which is defined by the appended claims.

REFERENCE NUMERALS

1 . . . sample
3 . . . primary X-rays
4 . . . X-ray source
5 . . . secondary X-rays generated from the sample
6, 6A, 6B, 6C, 6D . . . spectroscopic device
7 . . . secondary X-rays monochromated by the spectroscopic device
8 . . . detector
10 . . . interlocking unit
13 . . . multichannel pulse height analyzer
14 . . . qualitative analysis unit
15 . . . semi-quantitative analysis unit
16 . . . exchange mechanism
2θ . . . . scan angle

What is claimed is:

1. An X-ray fluorescence spectrometer comprising:
an X-ray source configured to irradiate a sample with primary X-rays;
a spectroscopic device configured to monochromate secondary X-rays generated from the sample;
a detector configured to receive the secondary X-rays monochromated by the spectroscopic device and generate a number of pulses proportional to intensities of the secondary X-rays, the pulses having pulse heights proportional to energy of the secondary X-rays;

an interlocking unit configured to interlock the spectroscopic device and the detector so as to change wavelengths of the secondary X-rays entering the detector, a multichannel pulse height analyzer configured to separate the pulses generated in the detector in accordance with a plurality of pulse height ranges and count the pulses in the respective pulse height ranges to output a differential curve that is a distribution of the intensities of the secondary X-rays against the pulse heights; and a qualitative analysis unit configured to simultaneously generate, for the secondary X-rays entering the detector at the wavelengths changed by the interlocking unit, an analytical pulse height width profile and a narrow pulse height width profile that are distributions of the intensities of the secondary X-rays against scan angles set by the interlocking unit on the basis of the differential curve which is output by the multichannel pulse height analyzer, as well as a predetermined analytical pulse height width for an analytical line that is a primary reflection line and a predetermined narrow pulse height width that is narrower than the analytical pulse height width, wherein the qualitative analysis unit identifies the analytical lines in the analytical pulse height width profile and the narrow pulse height width profile and adds any analytical line identified only in the narrow pulse height width profile to the analytical lines identified in the analytical pulse height width profile to obtain an identification result of the analytical lines.

2. The X-ray fluorescence spectrometer as claimed in claim 1, comprising a plurality of types of the spectroscopic devices and an exchange mechanism configured to switch the spectroscopic devices to be used, wherein the qualitative analysis unit identifies higher order reflection lines in the analytical pulse height width profile and the narrow pulse height width profile, the X-ray fluorescence spectrometer comprises a semi-quantitative analysis unit configured to perform semi-quantitative analysis that is quantitative analysis based on the analytical pulse height width profile and the narrow pulse height width profile, and the semi-quantitative analysis unit is configured to:

when selecting an analytical line for each analytical element, determine whether a higher order reflection line that acts as an interfering line interfering with the analytical line identified in the analytical pulse height width profile is identified;

if the higher order reflection line is not identified, select the analytical line;

if the higher order reflection line is identified, determine whether the analytical pulse height width profile includes the same analytical line monochromated by the spectroscopic device for removing the higher order reflection line;

if the same analytical line is included, select that analytical line;

if the same analytical line is not included, determine whether the analytical pulse height width profile includes an analytical line of a different kind;

if the analytical line of the different kind is not included, select the analytical line under consideration in the narrow pulse height width profile;

if the analytical line of the different kind is included, determine whether a higher order reflection line that acts as an interfering line interfering with the analytical line of the different kind is identified;

if the higher order reflection line is not identified, select the analytical line of the different kind;

if the higher order reflection line is identified, select the analytical line in the narrow pulse height width profile, which has a larger theoretical scan angle difference with respect to the higher order reflection line, from the analytical line under consideration and the analytical line of the different kind; and perform semi-quantitative analysis based on the intensities of the selected analytical lines.

* * * * *